United States Patent
McKenna et al.

(10) Patent No.: US 7,655,104 B2
(45) Date of Patent: Feb. 2, 2010

(54) METHOD OF FORMING A EMBOSSED, CROSS-LAMINATED FILM

(75) Inventors: Paul J. McKenna, Portland, OR (US); Robert G. Kobetsky, Chicago, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 446 days.

(21) Appl. No.: 11/263,467

(22) Filed: Oct. 31, 2005

(65) Prior Publication Data

US 2006/0051560 A1 Mar. 9, 2006

Related U.S. Application Data

(62) Division of application No. 10/740,134, filed on Dec. 18, 2003, now Pat. No. 7,338,700.

(51) Int. Cl.
*B29C 59/04* (2006.01)
*B32B 38/04* (2006.01)
*B32B 38/06* (2006.01)

(52) U.S. Cl. ............ 156/209; 156/253
(58) Field of Classification Search .......... None
See application file for complete search history.

(56) References Cited

U.S. PATENT DOCUMENTS

| | | | |
|---|---|---|---|
| 3,911,187 A | 10/1975 | Raley | |
| 5,196,254 A * | 3/1993 | Akiyama | 428/178 |
| 5,501,912 A | 3/1996 | Sergenius | |
| 5,714,107 A | 2/1998 | Levy et al. | |
| 5,804,285 A | 9/1998 | Kobayashi et al. | |
| 6,004,652 A | 12/1999 | Clark | |
| 6,007,898 A | 12/1999 | Kim et al. | |
| 6,221,463 B1 | 4/2001 | White | |
| 6,284,344 B1 * | 9/2001 | Barnes et al. | 428/98 |
| 6,299,966 B1 * | 10/2001 | Bonke et al. | 428/173 |
| 2004/0103989 A1 * | 6/2004 | Lin | 156/309.6 |

FOREIGN PATENT DOCUMENTS

| | | |
|---|---|---|
| DE | 2432350 | 1/1975 |
| DE | 3742960 | 7/1998 |
| EP | 0559969 | 9/1993 |
| EP | 0612888 | 8/1994 |
| WO | WO9704178 | 2/1997 |
| WO | WO9724916 | 7/1997 |

OTHER PUBLICATIONS

PCT Search Report dated May 3, 2005 for PCT/US2004/038821 filed Nov. 19, 2004.

* cited by examiner

*Primary Examiner*—Richard Crispino
*Assistant Examiner*—Barbara J. Musser
(74) *Attorney, Agent, or Firm*—Levenfeld Pearlstein, LLC

(57) ABSTRACT

A moisture resistant film is for covering an architectural structure. The film includes a flexible membrane defining a plane and a first plurality of spaced apart, discrete embossings formed in the membrane extending outwardly of the plane. The embossings are formed in rows in an x-direction and in columns in a y-direction. The rows are parallel to and spaced from one another and the columns are parallel to and spaced from one another. A method and tool for making the film are also disclosed.

2 Claims, 6 Drawing Sheets

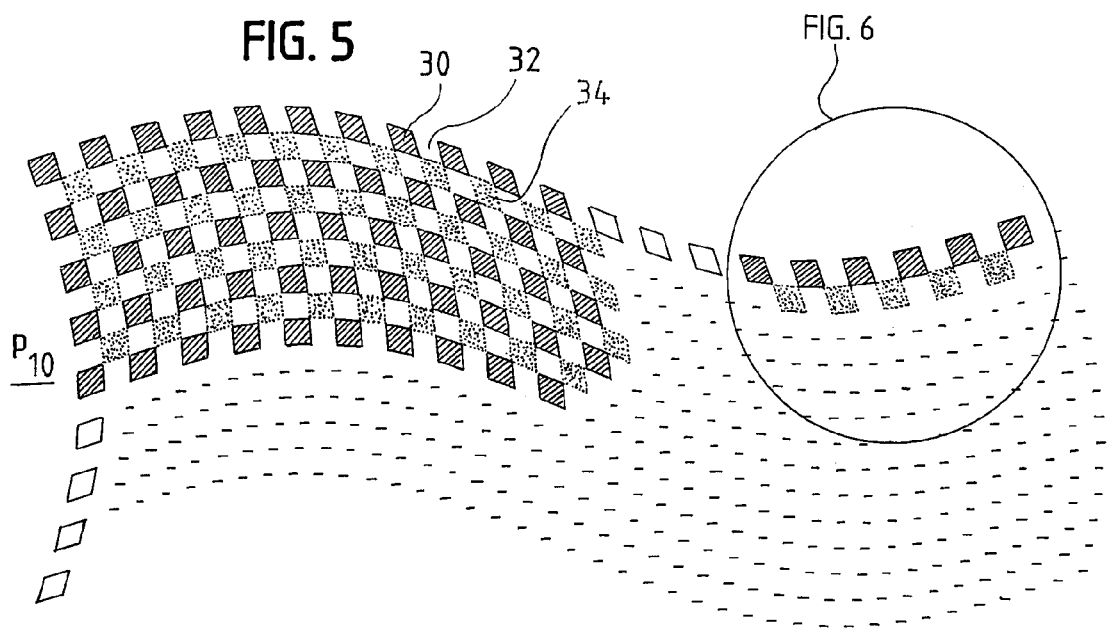
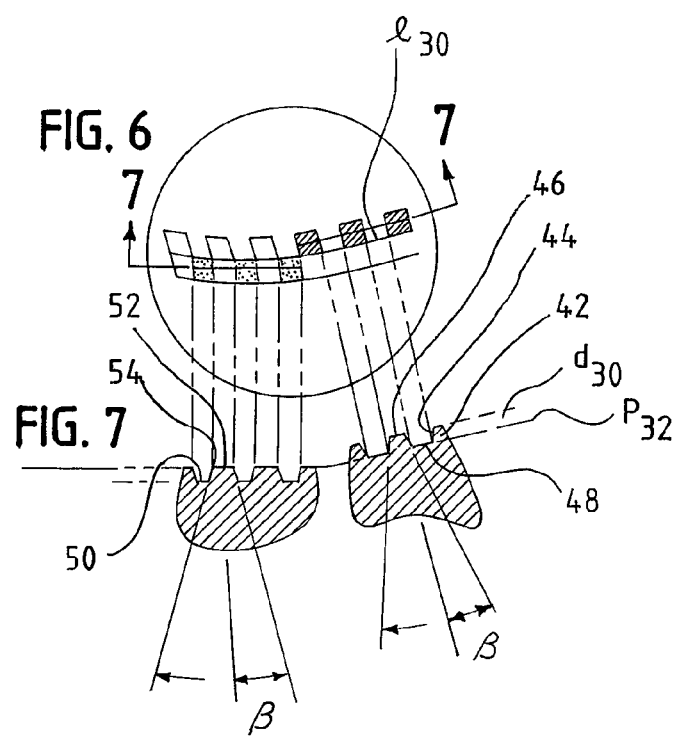

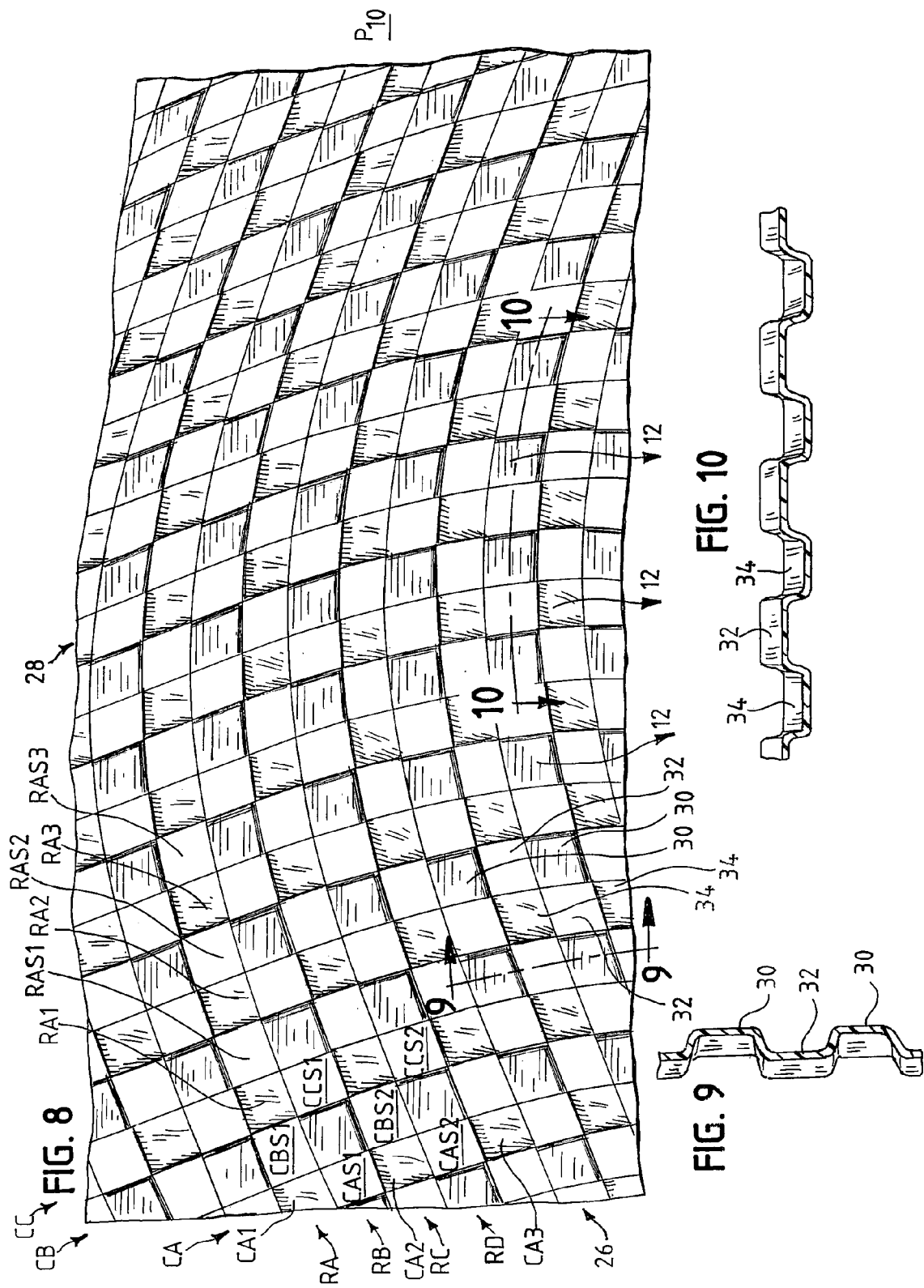

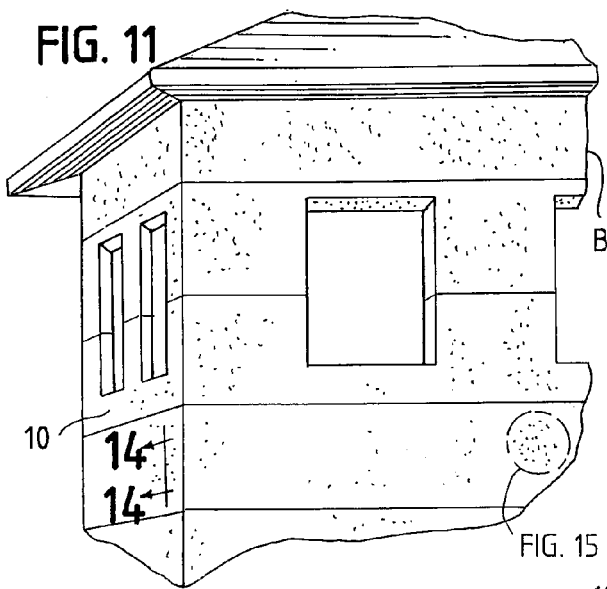
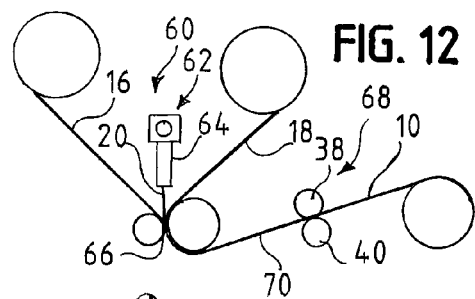
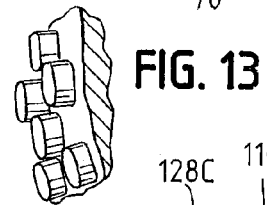
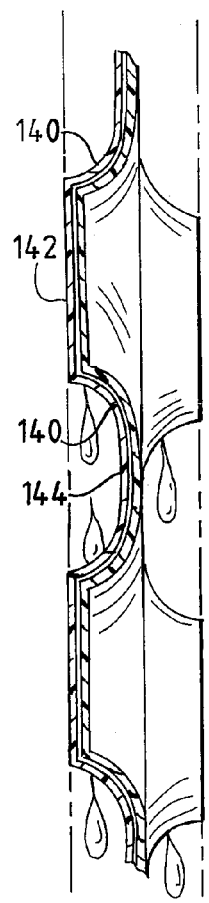
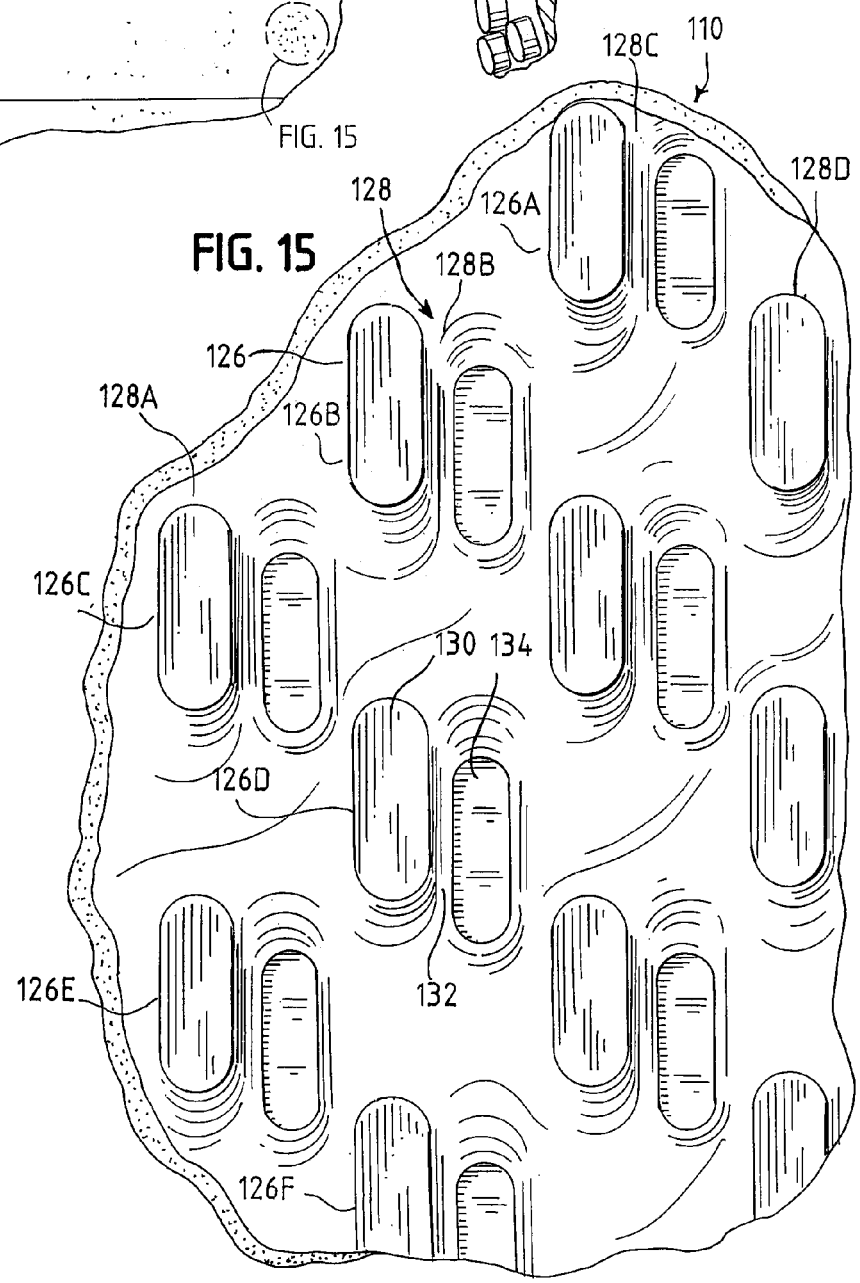

METHOD OF FORMING A EMBOSSED, CROSS-LAMINATED FILM

BACKGROUND OF THE INVENTION

The present invention relates to an embossed cross-laminated film or sheet construction. More particularly, the present invention relates to a sheet formed from a laminate of two cross-oriented films that is embossed to form a three-dimensional engineered surface material for use as a construction moisture barrier.

In the construction of buildings such as houses and the like, moisture and air barriers are used between the house framing and the outer covering, e.g., siding or clapboard. These barriers are used to prevent the intrusion of moisture into the areas of the building between the framing or inner walls and the outer house covering.

Moisture ingress between the outer covering and the framing or walls of a house can be problematic. For example, molds and fungus have been linked to the presence of water in certain areas of buildings. As such, there have been considerable efforts made to create barriers that not only prevent the ingress or intrusion of water (as bulk water and moisture or condensate) but also direct such water away from the interior walls to enhance drainage, prevent pooling and to reduce the opportunity for mold and fungus growth.

Barrier materials, also referred to as "house-wraps", are installed between frame sheathing surfaces and exterior covering or cladding products to provide a secondary layer of protection from moisture intrusion. This weather resistive barrier function can be further enhanced to promote drainage of moisture and the flow of air, to reduce the likelihood that water will penetrate further into the wall assembly where wetting of the substrate and framing materials could likely occur. Elevated moisture levels in these areas could contribute to mold growth and/or wood decay and ultimately increase the potential for structural failure.

Recently, house-wrap barrier materials have been developed that include drip channels or drainage channels to promote moisture drainage. However, these channels are direction dependent. That is, because of the geometry of the material and the geometry and "shape" of the channels formed in the material, in order for the material to function properly (that is, to drain properly), the material must be installed in a certain orientation or direction on the structure or building. In the event that the material is improperly installed, liquid can continue to pool and moisture or liquid intrusion can occur.

Moreover, known house-wrap materials are formed from woven materials. These materials tend to impart high tear resistance, which is highly desirable in the construction industry. However, such materials can be expensive to manufacture and are typically more permeable (to liquid water as opposed to water vapor) than non-woven materials.

Accordingly, there is a need for a house-wrap material having a high level of moisture resistance. Desirably, such a material has structure that permits it to direct water away from the interior regions of the structure to which it is installed. More desirably, such a material functions independent of the orientation at which it is installed on the structure. Most desirably, such a material has a high tear resistance and high overall strength to permit use in a wide variety of construction situations and at a wide variety of sites.

SUMMARY OF THE INVENTION

A moisture resistant house-wrap film is configured for covering an architectural structure. The house-wrap is formed from a flexible membrane defining a plane having a first plurality of spaced apart, discrete embossings formed in the membrane extending outwardly of the plane. The embossings are formed in rows in a (general) x-direction and in columns in a (general) y-direction. Preferably, a plurality of rows and a plurality of columns are formed. The rows are spaced from one another and the columns are spaced from one another. In a most preferred house-wrap, the rows and columns are non-rectilinear.

Such a house-wrap material has a high level of moisture resistance in combination with structure that permits it to direct water away from the interior regions of the structure to which it is installed. Such a material functions independent of the orientation at which it is installed on the structure and has a high tear resistance and high overall strength to permit use in a wide variety of construction situations and at a wide variety of sites.

In a preferred house-wrap, the rows are formed in parallel curved patterns and the columns are formed in parallel curved patterns. Most preferably, the curves (in both the x- and y-directions) are sine wave patterns. A present house-wrap has the first plurality of spaced apart discrete embossings formed transverse to the plane in a first direction and a second plurality of spaced apart, discrete embossings formed in the membrane extending outwardly of the plane in a second direction opposite of the first direction. The embossings are formed in rows in the x-direction and in columns in the y-direction. The rows and columns are non-rectlinear. In such a pattern, the rows and columns of the first plurality of embossings are spaced from one another by rows and columns of the second plurality of embossings. Non-embossed neutral spaces are disposed between each of the first plurality of spaced apart discrete embossings and between each of the second plurality of spaced apart discrete embossings. A present embossing has a truncated, pyramidal parallelogram shape.

A preferred film has the flexible membrane formed as a multi-layer lamination having a first oriented plastic layer and a second oriented plastic layer. The oriented plastic layers cross at an angle between but not equal to zero degrees and 180 degrees relative to one another. Preferably the layers are at an angle between 40 degrees and 140 degrees relative to the orientation of the other plastic layer, and most preferably, the layers are at an angle of orientation of about 90 degrees to one another.

Such a membrane has first and second plastic layers that are polyolefins, and preferably polyethylene. A bonding media can be disposed between the plastic layers.

A method of forming the moisture resistant flexible film includes the steps of laminating a first oriented plastic layer and a second oriented plastic layer to one another where the orientations of the first and second layers cross at an angle between but not equal to zero degrees and 180 degrees to form a flexible membrane defining a plane. The method includes forming in the flexible membrane a first plurality of spaced apart, discrete embossings extending outwardly of the plane. The embossings are formed in rows in an x-direction and in columns in a y-direction. In a preferred method, the rows and columns are non-rectilinear.

In a preferred method, in the forming step, the first plurality of spaced apart discrete embossings are formed transverse to the plane in a first direction and a second plurality of spaced apart, discrete embossings are formed in the membrane extending outwardly of the plane in a second direction opposite of the first direction. In such a method, the embossings are formed in rows in an x-direction and in columns in a y-direction. Preferably, the rows and columns are non-rectilinear, and the rows and columns of the first plurality of embossings are spaced from one another by rows and columns of the second plurality of embossings.

A tool for forming the embossings includes a roller having a plurality of embossing projections extending therefrom defining alternating first rows of alternating first direction embossing projections and neutral spaces and intermediate alternating second rows of second direction embossing projections (which second direction embossings are actually cavities) and neutral spaces. The alternating first rows of first direction embossing projections and neutral spaces are disposed to form alternating first columns of first direction embossing projections and neutral spaces and the intermediate alternating second rows of second direction embossing cavities and neutral spaces are disposed to form alternating second columns of second direction embossing cavities and neutral spaces. In a present tool, the first rows of first direction embossing projections and neutral spaces and second rows of second direction embossing cavities and neutral spaces are non-rectilinear and are parallel to one another and the first columns of first direction embossing projections and neutral spaces and second columns of second direction embossing cavities and neutral spaces are non-rectilinear and are parallel to one another. A present tool has a second mating roller having a mating profile.

These and other features and advantages of the present invention will be readily apparent from the following detailed description, in conjunction with the claims.

BRIEF DESCRIPTION OF THE DRAWINGS

The benefits and advantages of the present invention will become more readily apparent to those of ordinary skill in the relevant art after reviewing the following detailed description and accompanying drawings, wherein:

FIG. 5 is an enlarged illustration of the film of FIG. 4;

FIG. 6 is an enlarged view of the film of FIG. 5;

FIG. 7 illustrates sections of the embossing tool used to produce the film shown in FIGS. 5 and 6;

FIG. 8 illustrates a portion of the film sheet;

FIG. 9 is a cross-section of the sheet taken along line 9-9 of FIG. 8;

FIG. 10 is a cross-section of the sheet taken along line 10-10 of FIG. 8;

FIG. 11 is a schematic illustration of a building having the embossed cross-laminated house-wrap film installed thereon;

FIG. 12 is a schematic illustration of a process for forming the house-wrap film;

FIG. 13 is an enlarged view of a portion of an alternate tool for forming an alternate embossing in the film;

FIG. 14 is a cross-section of the alternate film;

FIG. 15 is a view of the top or bottom surface of the alternate film; and

DETAILED DESCRIPTION OF THE INVENTION

Figure 1:
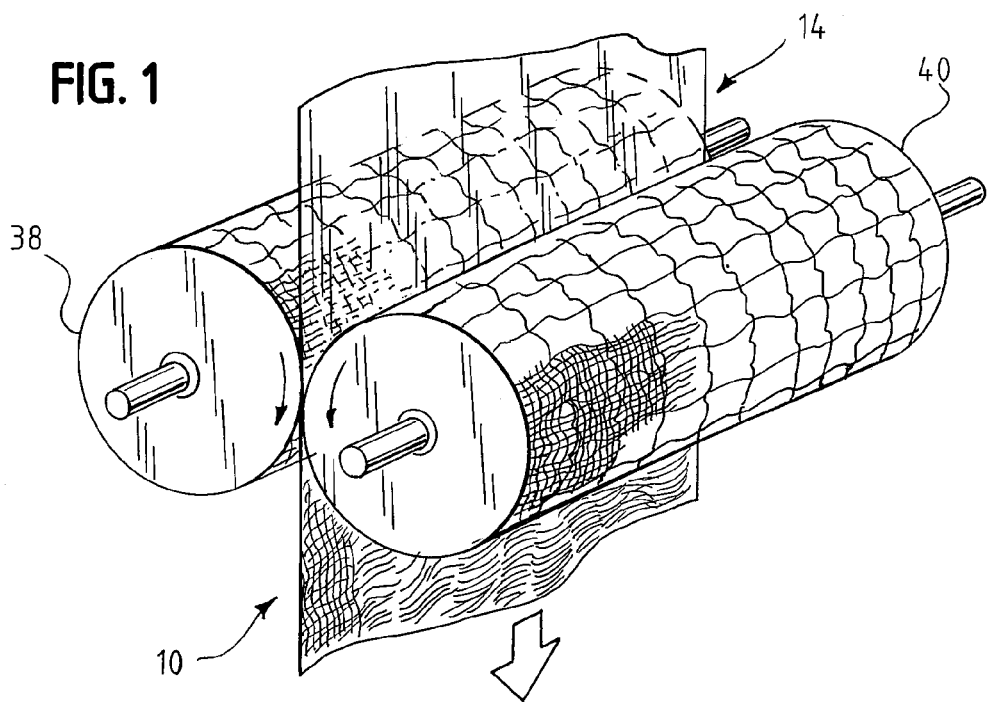
FIG. 1 is a perspective illustration of a tool (a pair of rollers), embodying one aspect of the present invention, for forming an embossed cross-laminated house-wrap film also of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be understood that the title of this section of this specification, namely, "Detailed Description Of The Invention", relates to a requirement of the United States Patent Office, and does not imply, nor should be inferred to limit the subject matter disclosed herein.

Referring now to the figures and briefly, to FIG. 8, there is shown one embodiment of an embossed, cross-laminated film 10, or house-wrap embodying the principles of the present invention. The house-wrap film 10 is shown positioned on a building B in FIG. 11. The house-wrap material 10 has a high level of moisture resistance and, as is described below, has a structure or engineered surface that permits it to channel water away from the interface of the material and the structure to which it is installed.

The house-wrap material 10 has an engineered surface that provides both a stand-off effect which precludes pooling or ponding, for example, along a ridge formed where house siding rests on the underlying house structure, and orientation independent channels 12 (see FIG. 8) to permit moisture (e.g., water) to dram from the surface of the wrap 10.

The wrap material 10 is preferably a cross-laminate of uniaxially oriented films from crystalline polymers. Such materials are known to exhibit a number of beneficial properties including improved tear resistance. One example of a multi-layer, oriented or "bias-cut" plastic film is disclosed in Barnes et al., U.S. Pat. No. 6,284,344, which is commonly assigned with the present invention and which is incorporated herein by reference.

Figure 16:
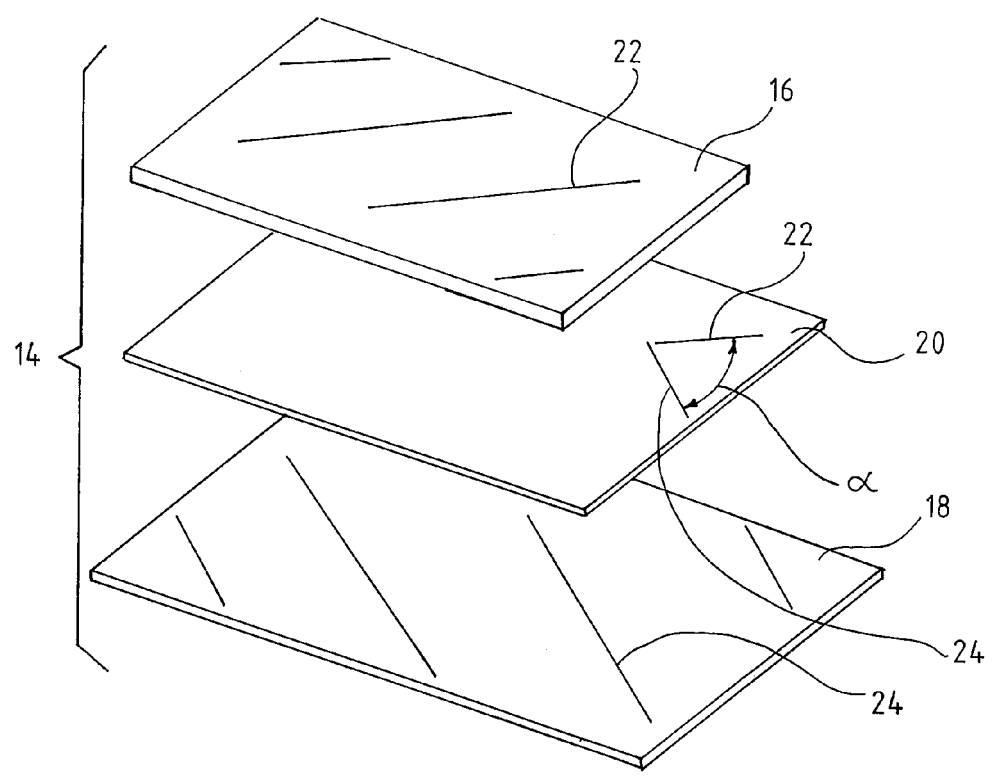
FIG. 16 is an exploded perspective view of a the multi-layer lamination used in the film of the present invention.

A preferred material is VALERON® brand film commercially available from ITW VALERON® of Houston, Tex. Referring to FIG. 16, the film 14 (also referred to as a web) is a polyolefin, preferably a high density polyethylene (HDPE) material that is formed from a cross-laminate of two film layers 16, 18 that are each extruded and bias cut in a continuous spiral to obtain molecular orientation at an angle to a roller onto which the film is collected The bias cut films 16, 18 are then cross-laminated, preferably with an adhesive or polymer 20 between the film layers 16, 18 to form the web 14. Other non-woven materials, such as polyethylene terephthalate (PET), and coextruded polymeric materials are contemplated for use in the embossed house-wrap film.

As seen in FIG. 16, the direction of orientation of the first film layer 16 crosses the direction of orientation of the second film layer 18 at a predetermined angle α such that the orientations of the layers 16, 18 are non-parallel. That is, the film layer orientations cross one another at an angle α between but not equal to zero degrees and 180 degrees. As seen in FIG. 16, the orientation of layer 16 is indicated by the lines at 22 and the orientation of layer 18 is indicated by the lines at 24. The angle α can range from about 40 degrees to about 140 degrees, and preferably ranges from about 78 degrees to about 104 degrees. A most preferred orientation angle is about 90 degrees so that the films 16, 18 are oriented perpendicular to one another. A preferred laminate web 14 has a thickness of about 3.2 thousandths of an inch (0.0032 inches or 3.2 mils) to about 4.0 mils. The web 14 can, of course be formed having other thicknesses, depending upon the desired application; however, it has been found that these web gauges or thicknesses function well for conventional residential construction.

Following cross-lamination, the web 14 has an engineered surface formed therein. A present surface is formed by embossing the web 14 to form the film 10. Embossings are formed in each direction of the web 14 relative to the plane $P_{10}$ of the film 10. That is, relative to the plane $P_{10}$ of the film 10 (being the plane of the drawing of FIGS. 5 and 8), the embossings are formed out of the plane of the paper (for purposes of discussion, this is referred to as a positive embossing 30) and into the plane of the paper (a negative embossing 34). When viewing the surface of the web 10, the embossings define positive embossings 30 and negative embossings 34 having a neutral region 32 for those areas that are not embossed. The embossings 30, 34 are formed in the z-direction of the film 10. It will be appreciated by those skilled in the art that what is viewed as a positive embossing 30 on one "side" of the film 10 is a negative embossing 34 on the other side of the film 10.

The embossings 30, 34 are configured in predetermined patterns in both the x-direction (or rows, indicated generally at 26) and the y-direction (or columns, indicated generally at 28) of the film 10. In a present film 10, neither the rows 26 nor the columns 28 are straight. Rather, as illustrated, the rows 26 and columns 28 are formed from discrete embossed 30, 34 elements disposed, as discussed below, in sine wave patterns. Each row 26 and each column 28 is formed from alternating positive embossings 30 and neutral plane regions or areas 32 or negative embossings 34 and neutral plane areas 32, with the rows 26 (or columns 28) staggered so that each region (that is, each embossing 30, 34 or each neutral area 32) is adjacent an unlike region. That is, because half of the regions in each row 26 and in each column 28 are neutral areas 32, the rows 26 (and columns 28) are formed relative to one another such that the neutral areas 32 do not share a common edge, but are staggered relative to one another (touching at their respective corners).

For example, referring to FIG. 8, the positive embossings of row RA (embossings RA1-RA10) are spaced from adjacent positive embossings in that row (that is, RA1 is spaced from RA2, which is spaced from RA3, and so on) by the neutral spaces RAS1, RAS2, RAS3, and so on. And, the positive embossings of row RA are spaced from the positive embossings of row RC by the neutral plane areas CAS1, CCS1 and so on. The same pattern is followed for the columns. That is, the positive embossings of column CA (embossings CA1-CA10) are spaced from adjacent positive embossings in that column (that is, CA1 is spaced from CA2, which is spaced from CA3, and so on) by the neutral spaces CAS1, CAS2, CAS3, and so on. And, the positive embossings of column CA are spaced from the positive embossings of column CC by the neutral plane areas CBS1, CBS2 and so on. As shown, the film 10 has at least two rows R (e.g., RA, RB, RC) and at least two columns C (e.g., CA, CB, CC). It will be appreciated from the figures that the present film 10 is formed having a checkerboard-like appearance, with about 25 percent of the "spaces" being positive embossings, about 25 percent of the "spaces" being negative embossings, and about 50 percent of the "spaces" being neutral plane areas or spaces.

It will, also be apparent that because the embossings 30, 34 that form the rows 26 also are the embossings 30, 34 that form the columns 28, each of the embossings 30, 34 will have a row designation and a column designation, and in this manner form a matrix.

Figure 3:
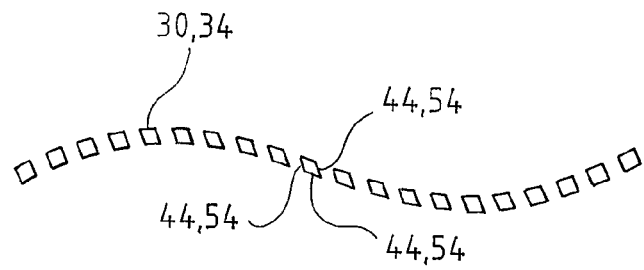
FIG. 3 illustrates the position, pattern and formation of the embossing elements of the tool.
Figure 4:
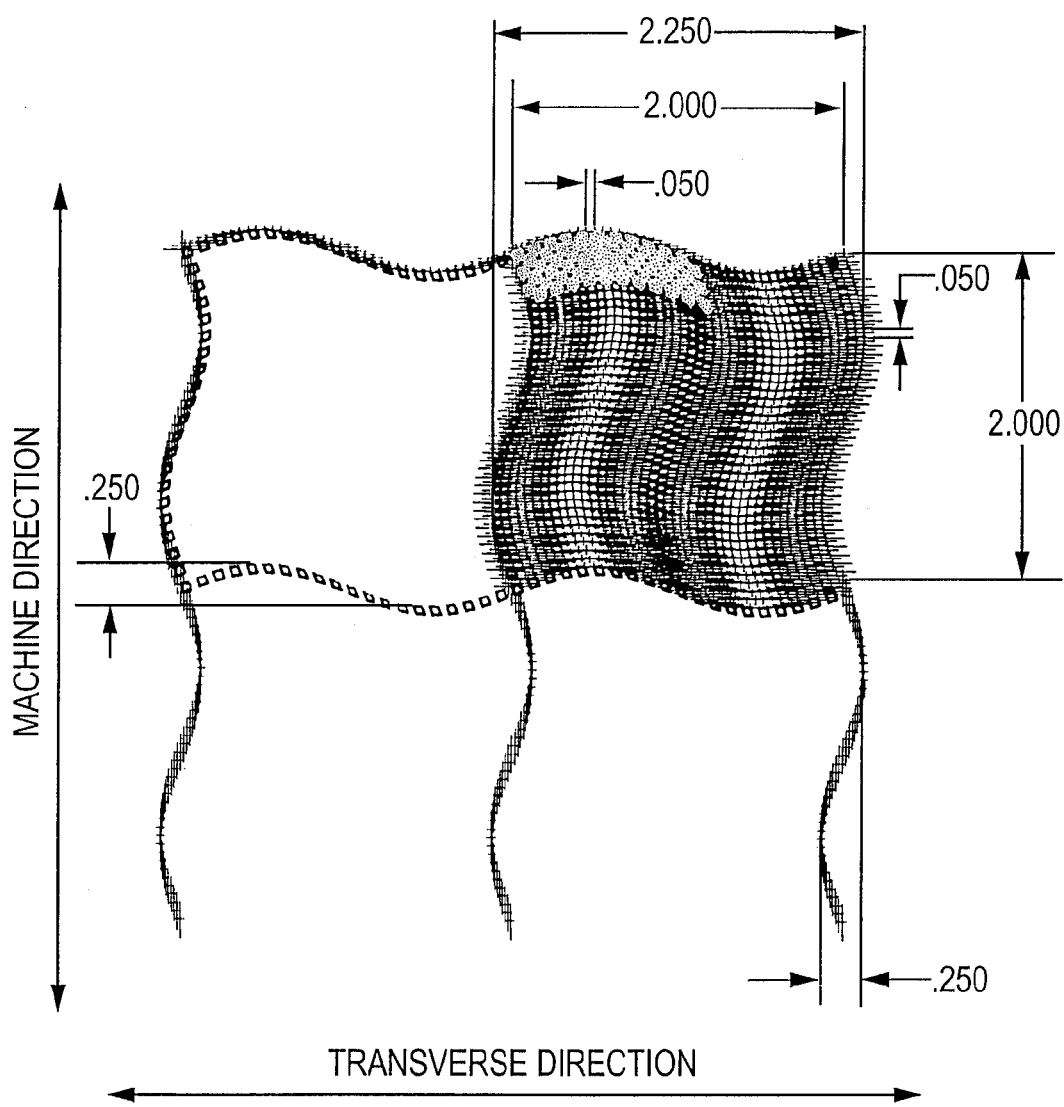
FIG. 4 illustrates one embodiment of the film as formed having a double sine wave embossing pattern formed therein.

As seen in FIG. 5, the rows 26 and the columns 28 are formed in a curved pattern or having a curved path. That is, the rows 26 and columns 28 do not form a straight line (are not rectilinear). Rather, the rows 26 and columns 28 are formed, preferably, having a sinusoidal patter In a contemplated wrap 10, the sine curves have a pitch of about 2.0 inches, and a peak to peak amplitude of about 0.25 inches. The embossings 30, 34 are formed having a side length $l_{30}$ of about 0.05 inches (about 50 mils) and a depth $d_{30}$ of about 0.035 inches (about 35 mils). The embossing "density" is about 40 embossings 30, 34 per side per repeating pattern (based on a 2 inch pitch) or about 1600 embossings per four square inches (or about 400 embossings per square inch). In a contemplated film 10, the embossings 30, 34 are each formed as a truncated pyramid having a parallelogram base (see FIG. 10). That is, the embossings 30, 34 are formed having four substantially equal length sides 130 (not necessarily square, but in a parallelogram shape, see e.g., FIG. 3), that taper inwardly in the upward direction (away from the neutral plane $P_{32}$) at an angle α of about 15 degrees.

Figure 2:
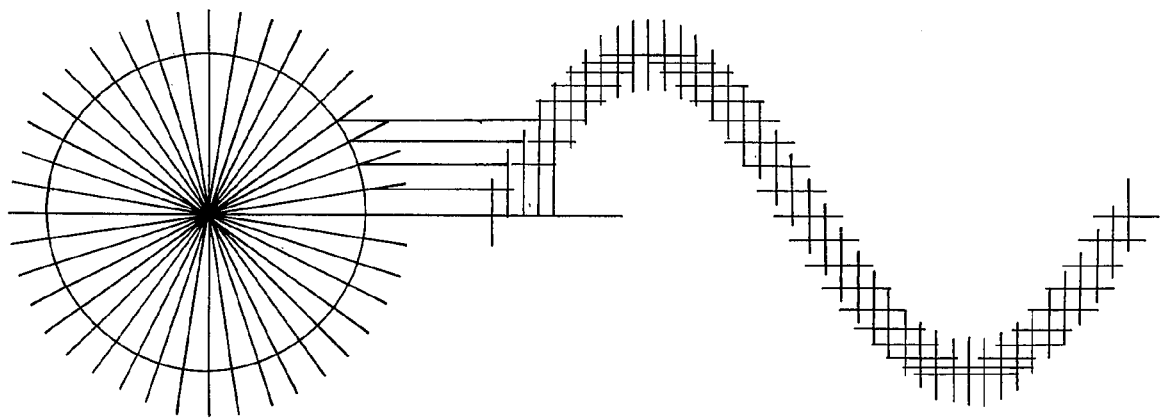
FIG. 2 illustrates, schematically, the formation of the tool embossing element locations.

One tool 36 for forming the embossed film 10 is illustrated in FIGS. 1-2 and 7, in which FIG. 7 illustrates two of regions of an embossing roller 38. A reference or neutral plane $P_{32}$ is defined by the roller 38 which corresponds to the neutral spaces 32 in the film 10 of FIG. 5. Projections 42 then extend outwardly from the roller 38 a height or distance $d_{42}$ of about 35 mils from the neutral plane $P_{32}$. The projections 42 are formed having a truncated square pyramidal shape with the sides 44 tapering inwardly at an angle β of about 15 degrees relative to a line perpendicular to the neutral plane $P_{32}$. The peaks 46 of the projections 42 are flat and the valleys 48 between the projections 42 (at the neutral plane $P_{32}$) are flat. As will be understood, the "projections" 42 form negative embossings 34.

In addition to the projections 42, recesses 50 are also formed in the roller 38 that form the positive embossings 30. The recesses 50 are formed in a mirror image relation to the projections 42; that is, the recesses 50 have a flat base 52 (corresponding to the neutral plane $P_{32}$) and sides 54 formed at an angle β of about 15 degrees relative to a line perpendicular to the neutral plane $P_{32}$.

The film 10 itself exhibits enhanced strength and tear resistance due to its cross-laminated structure. Those skilled in the art will recognize that the orientation of a plastic layer is a characteristic that is imparted to the film during manufacture. Typically, a polymer is melted and extruded into a bubble form from an extruder die. The film is then cooled, for example, using an annular air-ring (blown film process). The cooled bubble is collapsed to form layflat tubing which is then stretched. It is the extrusion and stretching operations that "orient" the film. Essentially, the long chain polymer molecules are oriented or directed as a result of the extrusion and stretching processes. The oriented layflat tubing so produced is then bias cut to produce a single layer of film where the orientation angle is at the desired angle to the machine direction.

One process (indicated generally at 60) for making the film 10 is illustrated in part and schematically in FIG. 12. In the film forming portion of the process (which is referred to as an extrusion lamination process), a station 62 is used to apply the cross-oriented laminate films 16, 18 to one another with a bonding material applicator 64 positioned to apply the bonding or adhesive sealing material 20 between the plastic layers 16, 18 at about a roller nip 66. Alternately, the plastic layers 16, 18 can be disposed directly on one another without the use of the bonding or sealing layer. In a contemplated film, however, the bonding layer 20 is disposed between the plastic layers 16, 18, which bonding layer 20 is formed from a media, such as low density polyethylene or the like.

This process forms a flexible, cross-laminated film or membrane 14, which is then conveyed to a second (or embossing) station 68, at which the membrane 14 is fed into the nip 70 of the embossing rollers 38, 40 to form the embossed film 10. The film 10 is perforated for permeability to permit the passage of water vapor but to preclude the passage of liquid water.

With respect to the material, it also is contemplated that adhesive laminations could be used as an alternative to extrusion lamination. In such a process, it is anticipated that a polymer (e.g., polyurethane) adhesive system is used. However, other polymeric adhesive systems are also contemplated. If needed, some arrangement of drying ovens can be used to remove solvents (from the adhesive) or the like.

An alternate embossing pattern 110 is illustrated in FIGS. 13-15. In this embodiment 110, the rows 126 and columns 128 are spaced so that adjacent rows or columns (of pairs of embossings 130, 134) are staggered relative to adjacent columns 126, or rows 128.

For example, the embossings in the second row 126B are in columnar alignment with the embossings in the fourth row 126D and the sixth row 126F, but are staggered relative to the embossings in the first row 126A, the third row 126C, the fifth row 126E, and so on (which are in columnar alignment with one another). Likewise, the embossings in the first column 128A are in row-alignment with the embossings in the third column 128C, and so one, but are staggered from those in the second column 128B, fourth column 128D, and so on.

The embossings 130, 134 are formed as three-dimensional elongated ovals having curved or rounded upper and lower ends 136 with elongated mid-sections 138. Essentially, the embossings 130, 134 have a race-track-like shape. As seen in FIG. 14, when viewed in the direction perpendicular to the plane of the web 110 (i.e., a cross-section), the embossings 130, 134 have curved side walls 140 with flattened peaks 142 and troughs 144.

The present house-wrap 10, 110, unlike the continuous channel type formed in known barrier materials, is formed by discrete, spaced apart formations 30, 34, 130, 134 in the web 14. A present house-wrap film 10, 110 functions independent of the orientation at which it is installed on the structure B. Most desirably, such a material 10, 110 has a high tear resistance and high overall strength to permit use in all construction situations and at all sites.

While specific embossing patterns, profiles, shapes and orientations have been describes, it is to be understood that various other patterns, profiles, shapes and orientations are contemplated by the present invention and are within the scope of the present invention.

All patents referred to herein, are hereby incorporated herein by reference, whether or not specifically done so within the text of this disclosure.

In the disclosures, the words "a" or "an" are to be taken to include both the singular and the plural. Conversely, any reference to plural items shall, where appropriate, include the singular.

From the foregoing it will be observed that numerous modification and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A method of forming a moisture resistant flexible film for covering an architectural structure comprising the steps of:

laminating a first oriented plastic layer and a second oriented plastic layer to one another where the orientations of the first and second layers cross at an angle between, but not equal to, zero degrees and 180 degrees relative to one another to form a flexible membrane defining a plane;

forming in the flexible membrane a first plurality of spaced apart, discrete embossings extending outwardly of the plane, the embossings formed in rows in an x-direction and in columns in a y-direction, the rows being spaced from one another and the columns being spaced from one another, the embossings configured to facilitate moisture drainage; and perforating the flexible membrane to enable water vapor permeation and to preclude liquid water permeation, wherein in the forming step the first plurality of spaced apart discrete embossings are formed transverse to the plane in a first direction and a second plurality of spaced apart, discrete embossings are formed in the membrane extending outwardly of the plane in a second direction opposite of the first direction, the embossings formed in rows in an x-direction and in columns in a y-direction, the rows and columns of the first plurality of embossings being spaced from one another by rows and columns of the second plurality of embossings.

2. The method in accordance with claim 1 wherein the rows and columns are non-rectilinear.

* * * * *

UNITED STATES PATENT AND TRADEMARK OFFICE
CERTIFICATE OF CORRECTION

PATENT NO. : 7,655,104 B2
APPLICATION NO. : 11/263467
DATED : February 2, 2010
INVENTOR(S) : McKenna et al.

It is certified that error appears in the above-identified patent and that said Letters Patent is hereby corrected as shown below:

Title Page, Item (54) should read "Method of Forming an Embossed, Cross-Laminated Film."

Column 4, line 37 should read "to drain from the surface . . . ."

At column 4, line 53, a period present in the application as filed is missing after the word "collected." The line should read "which the film is collected. The bias cut . . . ."

Column 6, line 22 should read "length sides I30 (not necessarily square . . . ."

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO.           : 7,655,104 B2                                                        Page 1 of 1
APPLICATION NO. : 11/263467
DATED                   : February 2, 2010
INVENTOR(S)         : McKenna et al.

It is certified that error appears in the above-identified patent and that said Letters Patent is hereby corrected as shown below:

Title Page, Item (54) and at Column 1, lines 1 and 2, should read "Method of Forming an Embossed, Cross-Laminated Film."

Column 4, line 37, should read "to drain from the surface . . . ."

At column 4, line 53, a period present in the application as filed is missing after the word "collected." The line should read "which the film is collected. The bias cut . . . ."

Column 6, line 22, should read "length sides I30 (not necessarily square . . . ."

This certificate supersedes the Certificate of Correction issued April 13, 2010.

Signed and Sealed this

Thirteenth Day of July, 2010

David J. Kappos
*Director of the United States Patent and Trademark Office*

UNITED STATES PATENT AND TRADEMARK OFFICE
CERTIFICATE OF CORRECTION

PATENT NO.       : 7,655,104 B2                                     Page 1 of 1
APPLICATION NO. : 11/263467
DATED            : February 2, 2010
INVENTOR(S)      : McKenna et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 548 days.

Signed and Sealed this

Twenty-third Day of November, 2010

David J. Kappos
*Director of the United States Patent and Trademark Office*